United States Patent
Matsushita et al.

[11] Patent Number: 5,922,246
[45] Date of Patent: Jul. 13, 1999

[54] EYEGLASS LENS AND MOLDED MATERIAL OF SYNTHETIC RESIN HAVING TRANSMITTANCE MINIMUM NO GREATER THAN 25% AT 550-585 NM

[75] Inventors: Shoshiro Matsushita; Ikuo Shimizu, both of Yokkaichi; Kazuko Mabuchi, Higashiosaka; Yoshihisa Ishiba, Daito; Oritoshi Murata, Higashiosaka, all of Japan

[73] Assignees: Kyowa Hakko Kogyo Co., Ltd, Tokyo, Japan; Yamamoto Kogaku, Osaka, Japan

[21] Appl. No.: 08/995,883

[22] Filed: Dec. 22, 1997

Related U.S. Application Data

[63] Continuation-in-part of application No. 08/679,771, Jul. 15, 1996, abandoned.

[30] Foreign Application Priority Data

Jul. 28, 1995 [JP] Japan ................................ 6-192988
Jan. 28, 1997 [JP] Japan ................................ 8-13706

[51] Int. Cl.$^6$ ................ F21V 9/00; G02C 7/10; G02B 1/04
[52] U.S. Cl. ............. 252/582; 252/586; 252/587; 252/588; 252/589; 351/44; 351/164; 351/165
[58] Field of Search .................... 252/582, 584, 252/586, 587, 588, 589; 351/163, 44, 164, 165

[56] References Cited

U.S. PATENT DOCUMENTS

| | | | |
|---|---|---|---|
| 4,911,546 | 3/1990 | Cohen | 351/44 |
| 5,080,688 | 1/1992 | Cohen | 351/44 |
| 5,274,403 | 12/1993 | Gott et al. | 351/47 |
| 5,408,278 | 4/1995 | Christman | 351/44 |

FOREIGN PATENT DOCUMENTS

| | | |
|---|---|---|
| 7-92301 | 4/1995 | Japan . |
| 9-263694 | 10/1997 | Japan . |

OTHER PUBLICATIONS

CAPLUS 1995: 632281.
WPIDS 97–545601, 1997.

Primary Examiner—Shean C. Wu
Attorney, Agent, or Firm—Fitzpatrick, Cella, Harper & Scinto

[57] ABSTRACT

A lens for eyeglasses and a molded synthetic resin for light transmitting filters are disclosed, which can reduce the glare of light and can provide a clear color sense, while retaining the lightness in the field of vision. The lens for eyeglasses and the molded synthetic resin for light transmitting filter are made of a synthetic resin base material comprising an organic dye with an absorption maximum in the vicinity of the central wavelength on the standard relative visibility curve, as well as an ultraviolet light absorbing agent and a blue light absorbing agent, the base material having a transmittance minimum in the range of wavelength extending from 550 to 585 nm on the transmittance curve, the transmittance of light at the transmittance minimum being not greater than 25%, the average transmittance of light over the range of wavelength extending from 590 to 660 nm being not less than 15%, and the average transmittance over the range of wavelength extending from 470 to 550 nm being not less than 10%. The above synthetic resin base material in the lens or the molded synthetic resin may further comprise an infrared light absorbing or reflecting agent.

21 Claims, 8 Drawing Sheets

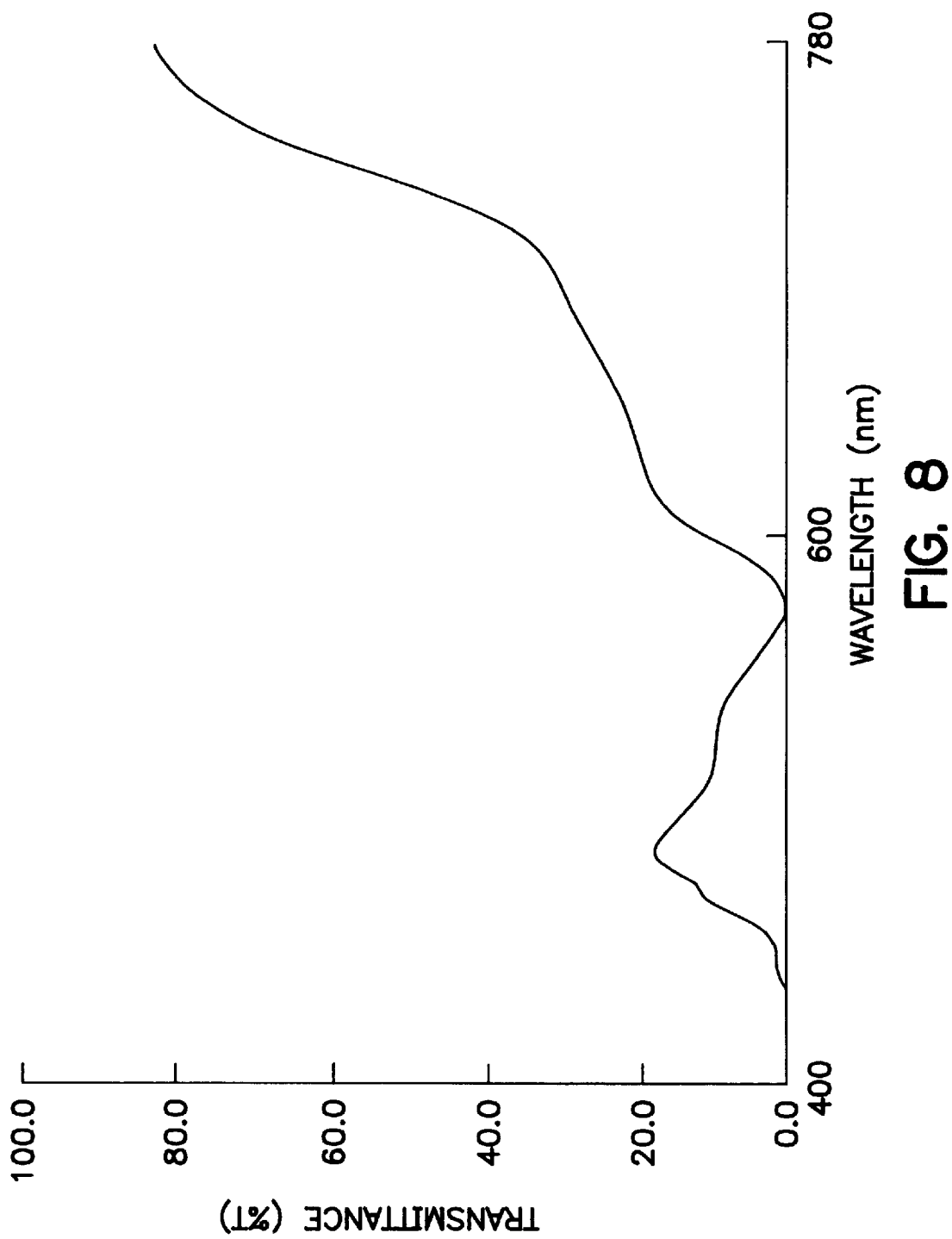

EYEGLASS LENS AND MOLDED MATERIAL OF SYNTHETIC RESIN HAVING TRANSMITTANCE MINIMUM NO GREATER THAN 25% AT 550-585 NM

CROSS-REFERENCE TO RELATED APPLICATION

The present application is a continuation-in-part application of a U.S. patent application Ser. No. 08/679,771 filed on Jul. 15, 1996, now abandoned.

FIELD OF THE INVENTION

The present invention relates to a lens for eyeglasses and a molded synthetic resin for light transmitting filters, which can reduce the glare of light and can provide a clear color sense, while retaining the lightness in the field of vision.

BACKGROUND OF THE INVENTION

The sunlight contains some kinds of light harmful to eyes and gives a sense of glare to the eyes. In general, sunglasses are used for controlling the transmission of sunlight and, therefore, produced under a design for decreasing the transmittance of light in the vicinity of the central wavelength on the standard relative visibility curve (FIG. 2) to reduce the glare. In the conventional sunglasses, however, the transmittance of light over the other range of wavelength is also decreased as shown in FIG. 3 as a result of decrease in light at the central wavelength of 555 nm. For this reason, when the sunglasses are used under the conditions that the amount of light is small such as in the twilight, the whole field of vision may become dark, and it may, therefore, be difficult to observe an object in the open air. In other words, the attempt at reducing the glare may result in an excessive decrease in the amount of transmitted light all over the range of wavelength, thereby causing a problem that the object cannot be fully observed.

As the sunglasses which can exhibit non-glaring effects by decreasing the transmittance of light in the vicinity of the central wavelength on the standard relative visibility curve, while retaining the lightness in the whole field of vision, there are well known sunglasses which are made of a glass material containing neodymium or didymium for absorption of light in the vicinity of 590 nm. From the viewpoint of easy handling, however, synthetic resins such as plastics, particularly polycarbonate with high impact resistance, rather than glasses are preferred as the base material. There has been, however, no plastic lens complying with such requirements, particularly made of polycarbonate. JP-B 53-39910 discloses a lens for eyeglasses, which can absorb light over a wide range of wavelength extending from 550 to 600 nm with good visibility. The lens of this type for eyeglasses is made of diethylene glycol bisallylcarbonate (CR-39) as the base material; however, if this material is made into polycarbonate, the resulting material will be difficult to be colored with a dye. Furthermore, the above lens for eyeglasses exhibits a gradual decrease in the transmittance of light over the wavelength range of about 550 to 650 nm (yellow to orange color). If the transmittance of yellow light is decreased for the purpose of enhancing non-glaring effects, the transmittance of orange light is also decreased with such a decrease. Therefore, when eyeglasses with such lenses are used by the improper method of use, for example, these lenses are hard to transmit orange light from sodium lamps (central wavelength, 589 nm) for illumination in a tunnel, and there is a possibility that the filed of vision may become dark.

On the other hand, it is well known that ultraviolet light or other light having potential influences on the eyes is emitted from a screen of the CRT such as those of a personal computer, a word processor or the like. In order to shut up such light, there has been used a filter attached to a front surface of the screen. As such a filter, there is a filter having an effect for preventing reflected light from the front surface of the screen. In addition, there is a filter that can cut off ultraviolet light, or reduce the transmittance over a wide range of visible light in order to reduce glare of the screen. In this respect, these functions are common to those of the conventional sunglasses which are used for controlling the transmission of the sunlight. Therefore, when the conventional filter for sunglasses with the transmittance curve as shown in FIG. 3 is used as the front surface of the CRT screen, there is a possibility that the whole field of vision may become dark, and an image of the CRP cannot be clearly perceived. Furthermore, when the filter for the CRT having an equivalent structure to that of the aforementioned lens for eyeglasses disclosed in JP-B 53-39910/1978 is made and used, the amount of whole transmitted light may excessively decreased where the CRT screen displays a colorful moving image such as today's television games, or a color contrast may be deteriorated and, thereby, in some cases, color may become hard to be discriminated and the object image cannot be clearly perceived.

SUMMARY OF THE INVENTION

Under these circumstance, the present inventors have intensively studied to develop a lens for eyeglasses and a molded synthetic resin, which can reduce the glare of light and can provide a clear color sense, while retaining the lightness in the field of vision. As a result, we have found that the above problems can be solved by reducing the transmittance of light over a particular wavelength range, thereby completing the present invention.

The present invention provides a lens for eyeglasses, which is made of a synthetic resin base material comprising an organic dye with an absorption maximum in the vicinity of the central wavelength on the standard relative visibility curve, as well as an ultraviolet light absorbing agent and a blue light absorbing agent, the base material having a transmittance minimum in the range of wavelength extending from 550 to 585 nm on the transmittance curve, the transmittance of light at the transmittance minimum being not greater than 25%, the average transmittance of light over the range of wavelength extending from 590 to 660 nm being not less than 15%, and the average transmittance over the range of wavelength extending from 470 to 550 nm being not less than 10%. The above synthetic resin base material in the lens for eyeglasses may further comprise an infrared light absorbing or reflecting agent.

The present invention also provides a molded material, which is made of a synthetic resin base material comprising an organic dye with an absorption maximum in the vicinity of the central wavelength on the standard relative visibility curve, as well as an ultraviolet light absorbing agent and a blue light absorbing agent, the base material having a transmittance minimum in the range of wavelength extending from 550 to 585 nm on the transmittance curve, the transmittance of light at the transmittance minimum being not greater than 25%, the average transmittance of light over the range of wavelength extending from 590 to 660 nm being not less than 15%, and the average transmittance over the range of wavelength extending from 470 to 550 nm being not less than 10%. The above molded material may further comprise an infrared light absorbing or reflecting agent.

The present invention further provides a molded material, having the above essential features, for a light transmitting filter that is used as a part of electric display devices of color image displaying devices, such as a CRT display device or as a part of color image observing systems, or used in a combination with the above devices or systems.

BRIEF DESCRIPTION OF THE DRAWINGS

FIG. 8 is a graph showing the spectral transmittance of light through the lens obtained in Example 11 and the molded synthetic resin obtained in Example 12.

DETAILED DESCRIPTION OF THE INVENTION

Figure 1:
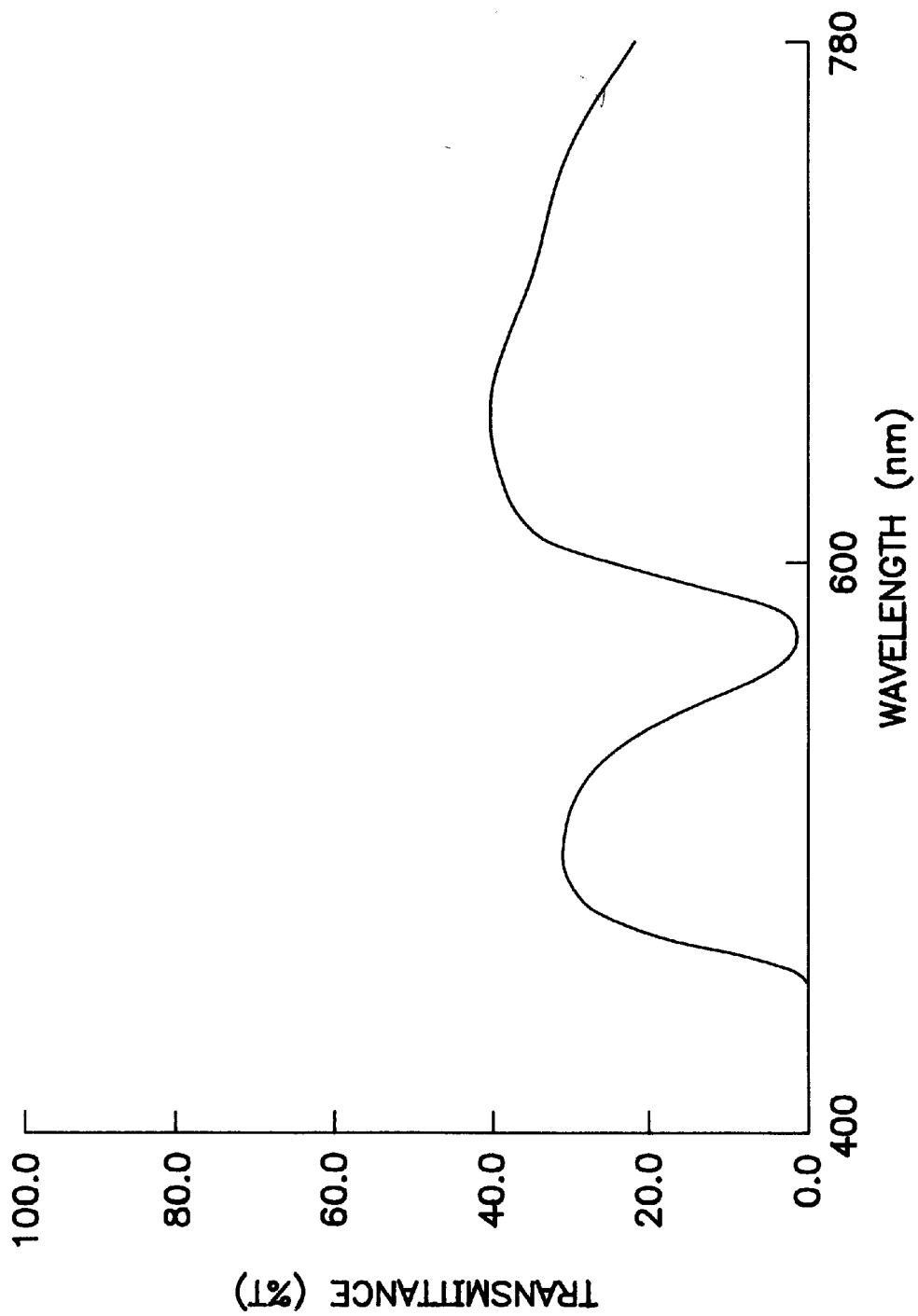
FIG. 1 is a graph showing the spectral transmittance of light through the lens obtained in Example 1 and the molded synthetic resin obtained in Example 2.
Figure 2:
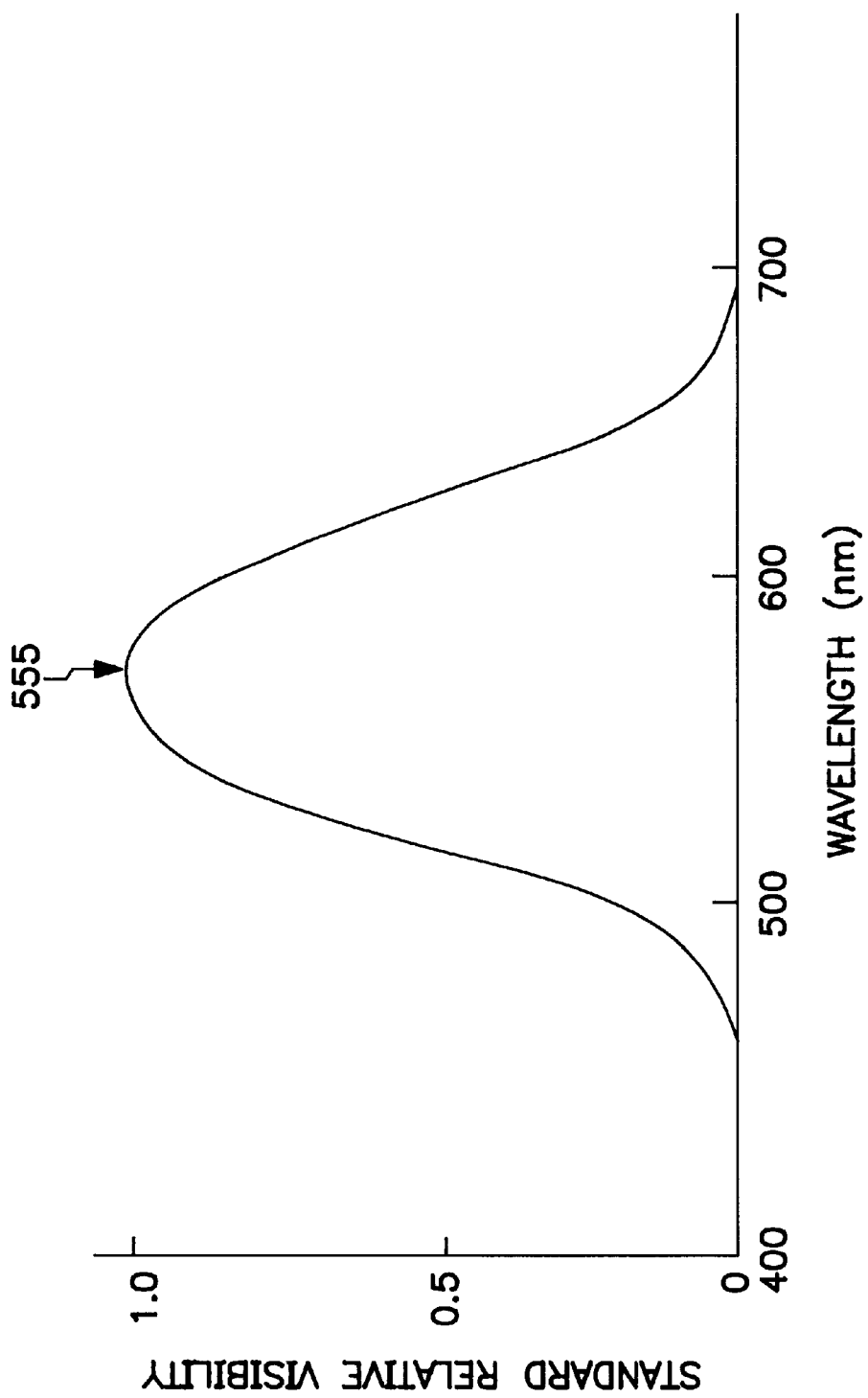
FIG. 2 is a graph showing the standard relative visibility curve.
Figure 3:
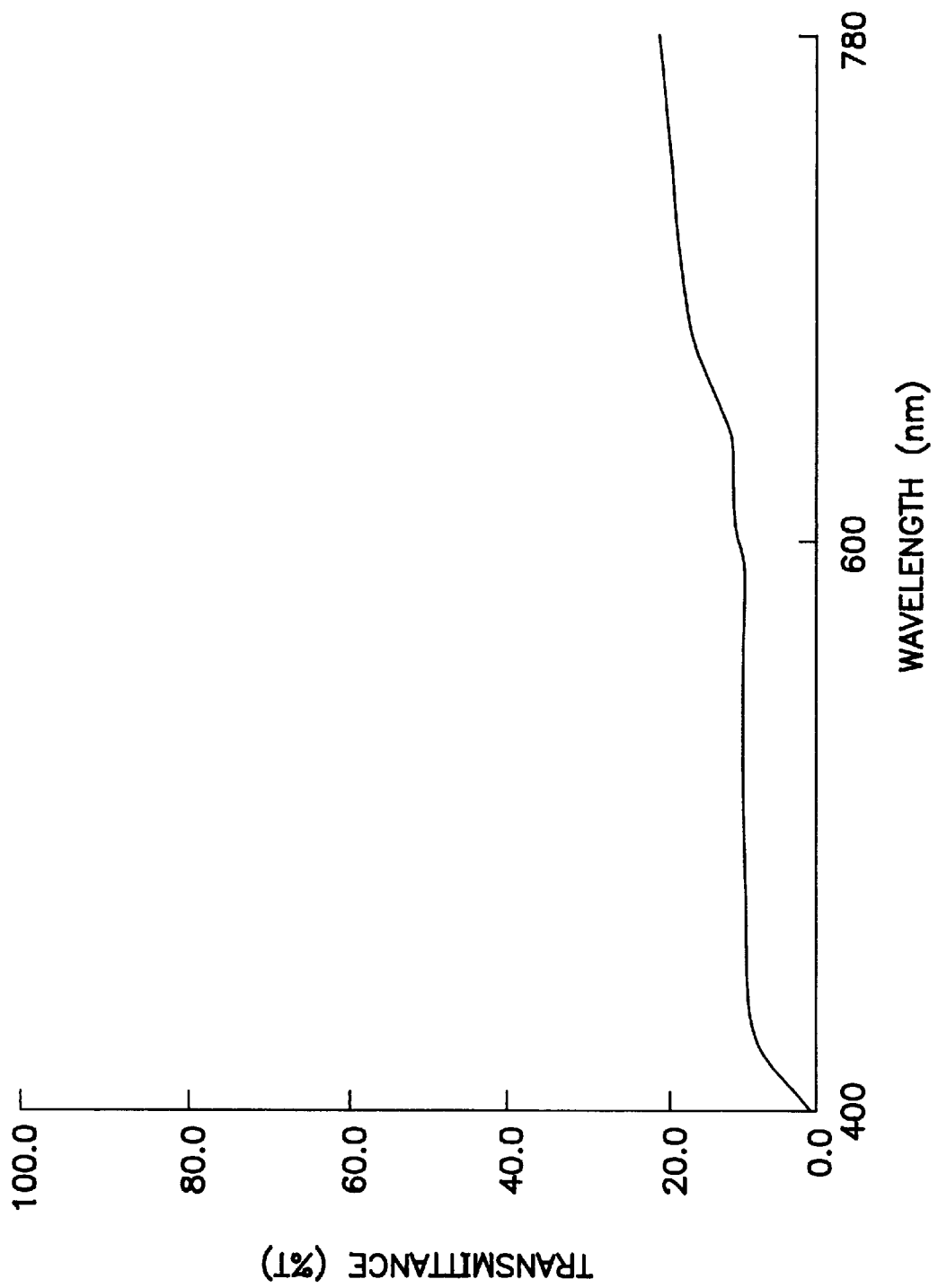
FIG. 3 is a graph showing the pattern of the transmittance of light through the most popular conventional sunglasses.

As used herein, the term "the central wavelength on the standard relative visibility curve" refers to the wavelength of about 555 nm, and the term "the vicinity of the central wavelength on the standard relative visibility curve" refers to the range of wavelength extending from about 530 to 585 nm. As the organic dye with an absorption maximum in the vicinity of the central wavelength on the standard relative visibility curve, any squarylium compound of formula (I):

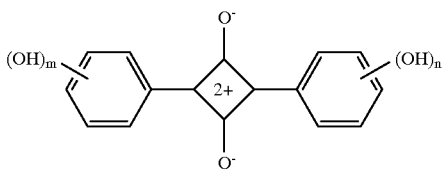

[wherein m and n are the same or different and represent integers of 1 to 4] is preferred [the compound of formula (I) is hereinafter referred to as compound (I), and this rule is also applied to the other compounds with formula numbers].

Since neodymium and didymium, which have been used in the conventional glass as a dye for light absorption, are inorganic materials, they can be incorporated in the form of metal ions into glass lenses formed by fusion at high temperatures; however, they cannot be used with any synthetic resin because they are not fully dispersed, when mixed with the synthetic resin, which is due to their incompatibility with the molten resin. In the present invention, the above squarylium compound is compatible with the molten resin, and by the use of this compound as a light absorbing agent, it becomes possible to reduce the glare of light. For reduction of glare, the use of an organic dye with an absorption maximum at 555 nm is most preferred as an ideal case; however, such is not necessarily required, and so long as the absorption peak is in the vicinity of 555 nm, the organic dye can fairly well absorb light in the vicinity of the central wavelength on the standard relative visibility curve because the absorption peak has a width to a certain extent, thereby making it possible to reduce the glare without any problem in practical use.

The above squarylium compounds per se are well known in the art and can be produced by or in accordance with the method as described, for example, in Angew. Chem. Internat. Edit., 7, 530–535 (1968) and Liebigs Ann. Chem., 712, 123 (1968).

As the ultraviolet light absorbing agent, for example, JF-86 from Johoku Chemical Co., Ltd. or Seesorb 705 from Sipro Kasei Co., Ltd. can be used.

As the blue light absorbing agent, for example, Kayaset Yellow A-G from Nippon Kayaku Co., Ltd. or PS Orange GG from Mitsui Toatsu Dyes, Ltd. can be used.

As the infrared light absorbing or reflecting agent, for example, IR750 from Nippon Kayaku Co., Ltd. or IR Additive 200 from Dainippon Ink & Chemicals, Inc. can be used.

As the synthetic resin base material for a lens for eyeglasses or a molded synthetic resin, polycarbonate is most preferred because of its excellent impact resistance. In addition, polymethyl methacrylate (PMMA), CR-39 (PPG Industries, Inc. in USA), or cellulose plastics such as cellulose acetate or cellulose propionate can also be used.

An example of the color image displaying device includes an electric display device. As used herein, the term "the electric display device" includes, but not limited to, a luminescent type of electric display device such as a cathode ray tube (CRT), a vacuum fluorescent display (VFD), an electroluminescent panel (ELP), a light emitting diode (LED), a plasma display panel (PDP), an incandescent lamp (ICL), a laser display and the like, as well as, a non-luminescent type of electric display device such as a liquid crystal display (LCD), an electrochromic display (ECD) and the like. Examples of displaying mode of such an electric display device include direct view type as in the cathode ray tube, projection type (including front- and rear-projection types) as in a projection-type liquid crystal display, and off-screen type, a representative of which is holography. When the molded synthetic resin according to the present invention is used as the light transmitting filter for the color image in the above electric display device, the relatively high effect may be exhibited. When the color image is a vigorously moving image such as in the television games, the higher effect can be seen.

As used herein, the term "the electric display device" may further include a traffic signal and a back light or a brake lamp of cars.

As used herein, the term "the color image observing system" include an observation platform and a window for prospect in sightseeing buses.

The requirements that the lens should have a transmittance minimum in the range of wavelength extending from 550 to 585 nm on the transmittance curve and that the transmittance of light at the transmittance minimum should be not greater than 25% are for decreasing the transmittance of light over the range of wavelength in the visible light where the greatest glare is given to the eyes. It is preferred that the transmittance of light at the transmittance minimum is not greater than 20%, more preferably not greater than 15%.

The requirement that the average transmittance of light over the range of wavelength extending from 590 to 660 nm should be not less than 15% is for retaining the transmittance of orange light, which is preferably not less than 20%. In addition, it is preferred that the lens or the molded resin has a transmittance maximum in the range of wavelength extending from 590 to 660 nm on the transmittance curve and the transmittance of light at the transmittance maximum is not less than 30%, most preferably not less than 35%. These latter requirements can be effectively achieved by incorporating an infrared light absorbing or reflecting agent, in addition to the organic dye with an absorption maximum in the vicinity of the central wavelength on the standard relative visibility curve, the ultraviolet light absorbing agent, and the blue light absorbing agent, into the synthetic resin base material. Thus the appropriate color balance of the whole transmitted light can be given by preventing the excess transmission of red light, while retaining the transmittance of orange light at a high level.

The requirement that the average transmittance of light over the range of wavelength extending from 470 to 550 nm should be not less than 10% is for obtaining the color balance of transmitted light and the lightness in the filed of vision. In particular, it is preferred that the transmittance of light at any wavelength in the range of wavelength extending from 470 to 550 nm is not less than 15%, most preferably not less than 20%.

The transmittance of light in the range of wavelength extending from 400 to 450 nm is preferably made substantially equal to zero by a blue light absorbing agent.

The reasons why not only the glare of light can be ameliorated, but also the color balance and color contrast can be improved by the aforementioned limitation of each transmittance of light, when the molded synthetic resin is used for the light transmitting filter, may be contemplated as follows.

First, absorption and extinction of light over the range of wavelength extending from 550 to 585 nm not only suppress the glare but also generate a continuous gap in visual system responses between red and green colors, which results in easy discrimination between red and green colors. This is based on the same reason why it may be assumed that adjacent colors in a rainbow are easily discriminated supposed that there is a somewhat dark portion on the boundary therebetween, although the boundary usually cannot be clearly perceived. On the other hand, blue light tends to be scattered not only by dust or water vapor in the atmosphere but also in eyeballs, and this is responsible for reduction in the clearness of the field of vision. The inclusion of the blue light absorbing agent for extinction in blue light leads to balance between the transmittance of yellow light and that of blue light and totally enhances the clearness. Moreover, as a result, the color balance between red, yellow, green, and blue can be realized, and also the color contrast can be emphasized.

The following will describe an example of the lens for eyeglasses and the molded synthetic resin according to the present invention.

The lens for eyeglasses and the molded synthetic resin can be obtained by adding an organic dye with an absorption maximum in the vicinity of the central wavelength on the standard relative visibility curve as described above, an ultraviolet light absorbing agent, a blue light absorbing agent, and an infrared light absorbing or reflecting agent to a synthetic resin raw material as the base material of the lens or molded synthetic resin, followed by mixing and then forming into shape of the lens or molded synthetic resin by injection molding in the case of lens base material or by extrusion or injection molding in the case of molded synthetic resin base material to ensure that the additives are uniformly dispersed all over the base materials. Some of the additives such as absorbing agents, e.g., infrared light reflecting agent, can also be coated on the surface of lens or molded synthetic resin by vacuum deposition or the like.

The content of the organic dye is preferably in the range of 0.0001% to 0.01% by weight, most preferably 0.0005% to 0.005% by weight, based on the synthetic resin base material as the base material of the lens for eyeglasses or the molded synthetic resin. The content of the ultraviolet light absorbing agent is preferably in the range of 0.1% to 1.0% by weight, most preferably 0.3% to 0.8% by weight, based on the synthetic resin base material. The content of the blue light absorbing agent is preferably in the range of 0.001% to 0.02% by weight, most preferably 0.002% to 0.01% by weight, based on the synthetic resin base material. The content of the infrared light absorbing or reflecting agent is preferably in the range of 0.001% to 0.05% by weight, most preferably 0.001% to 0.02% by weight, based on the synthetic resin base material.

Upon the use of the present invention, a polarizing element can also be used in combination with the lens for eyeglasses or the molded synthetic resin. The lens for eyeglasses and molded synthetic resin into which a polarizing agent is incorporated can also be produced by insert molding, lamination using adhesives or the like to use. The term herein referred to as "the polarizing element" means a polarizing film per se or the film onto which the plastic sheet or sheets are laminated on either one or both surfaces thereof to form into one piece. When insert molding is employed, a polarizing element onto which the plastic sheet or sheets are laminated on one or both surfaces to form one piece, is inserted into a mold, which is then used for injection molding to form the polarizing element and the resin into one piece.

A decrease in the transmittance of light through the lens for eyeglasses or the molded synthetic resin, which may be caused by combination of the polarizing element and the synthetic resin base material, or by incorporation of the polarizing element, can be recovered, for example, by changing the content of a dye to be incorporated, so that the transmittance of light and the transmittance curve with respect to the lens for eyeglasses or the molded synthetic resin are included within the scope of the present invention.

The present invention will be further illustrated by the following examples; however, the present invention is not limited to these examples.

EXAMPLE 1

The ingredients listed below were mixed and formed into a lens shape having an outer diameter of 75 mm and a central thickness of 2 mm by an injection molding machine [from Nissei Plastic Industrial Co., Ltd.] at a regulated temperature of 250° C. to 300° C. The spectral transmittance of light through the lens thus obtained is shown in FIG. 1. This lens gave no sense of glare even under strong sunlight and no trouble in observing an object in the field of vision even when driving in a tunnel.

| | |
|---|---|
| Polycarbonate resin [H-3000FN from Mitsubishi Engineering Plastics Co., Ltd.] | 15 kg |
| Ultraviolet light absorbing agent [JF-86 from Johoku Chemical Co., Ltd.] | 60 g |

| | |
|---|---|
| Blue light absorbing agent [Kayaset Yellow A-G from Nippon Kayaku Co., Ltd.] | 1.05 g |
| Infrared light absorbing agent [IR Additive 200 from Dainippon Ink & Chemicals, Inc.] | 1.84 g |
| Compound (1) | 0.24 g |

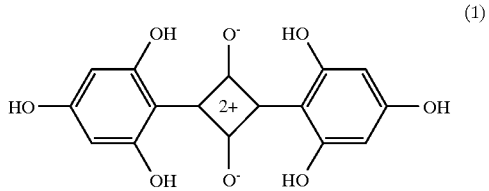

(1)

EXAMPLE 2

The same mixture as that of Example 1 was formed into a sheet having an outer diameter of 255 mm×330 mm and a thickness of 2 mm by an injection molding machine at a regulated temperature of 250° C. to 300° C. The spectral transmittance of light through the sheet thus obtained is shown in FIG. 1. When this sheet was hanged in parallel with a front surface of the CRT screen and the television game was continued on the screen, it gave no sense of glare, and slight fatigue even in a case of a long time game. Furthermore, it became easy to discriminate the colors of blue, green, yellow, and red, and the color contrast also became clear.

EXAMPLE 3

Figure 4:
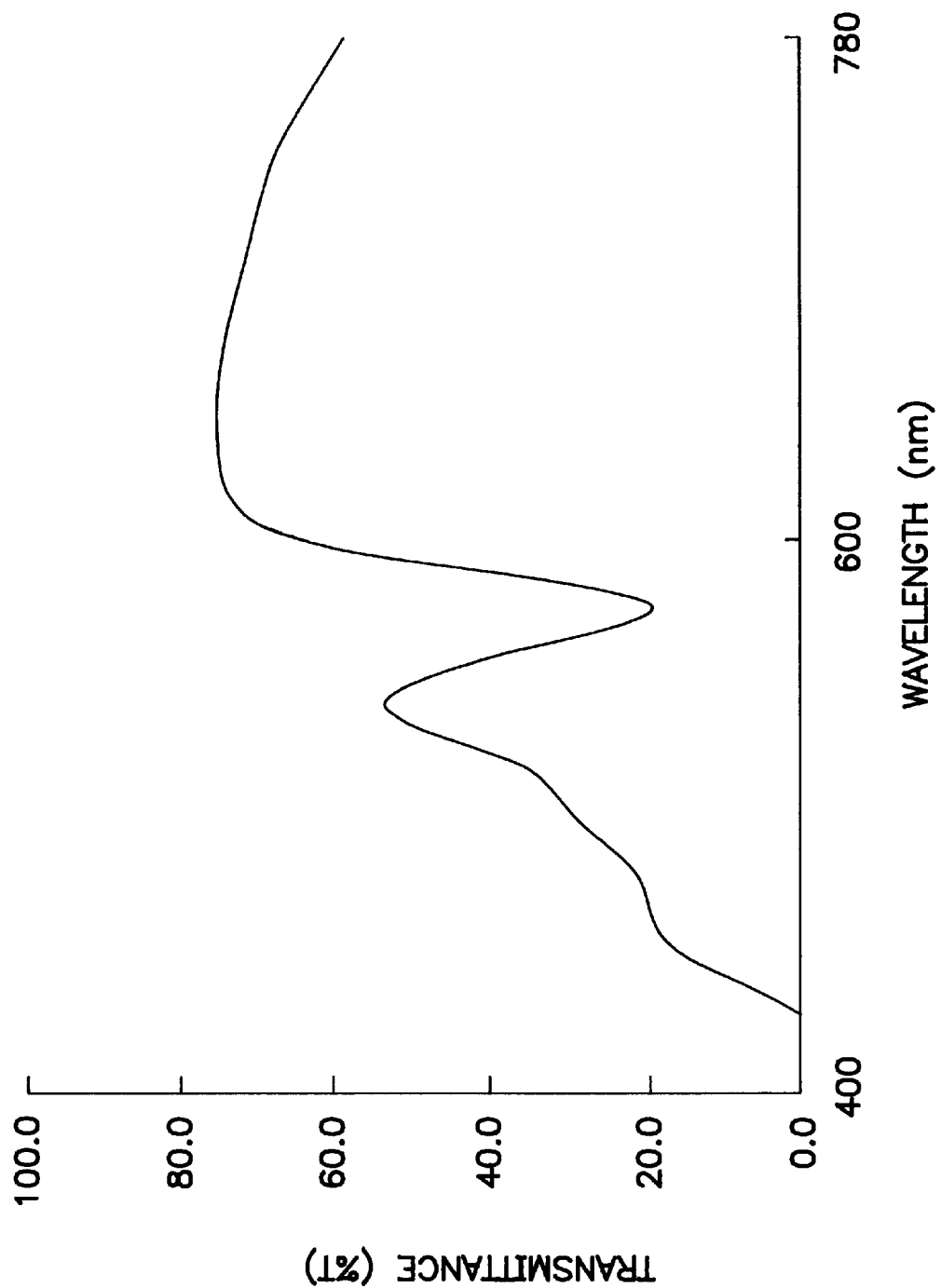
FIG. 4 is a graph showing the spectral transmittance of light through the lens obtained in Example 3 and the molded synthetic resin obtained in Example 4.

The ingredients listed below were mixed and formed into a lens shape having an outer diameter of 75 mm and a central thickness of 2 mm by the above injection molding machine at a regulated temperature of 250° C. to 300° C. The spectral transmittance of light through the lens thus obtained is shown in FIG. 4. This lens gave no sense of glare even under strong sunlight and no trouble in observing an object in the field of vision even when driving in a tunnel.

| | |
|---|---|
| Polycarbonate resin [H-3000FN from Mitsubishi Engineering Plastics Co., Ltd.] | 15 kg |
| Ultraviolet light absorbing agent [JF-86 from Johoku Chemical Co., Ltd.] | 60 g |
| Blue light absorbing agent [PS Orange GG from Mitsui Toatsu Dyes, Ltd.] | 0.5 g |
| Infrared light absorbing agent [IR 750 from Nippon Kayaku Co., Ltd.] | 0.26 g |
| Compound (1) | 0.15 g |

EXAMPLE 4

The mixture of ingredients listed below was formed into a continuous sheet having a thickness of 2 mm by the above injection molding machine at a regulated temperature of 250° C. to 300° C., and this sheet was cut into a sheet having an outer diameter of 550 mm×700 mm. The spectral transmittance of light through the sheet thus obtained is shown in FIG. 4. When this sheet was hanged in parallel with the front surface of the commercial game machine and the television game was continued on the screen based on a game software, it gave no sense of glare in a case of a glittering screen, and slight fatigue even in a case of a long time game. Furthermore, it became easy to discriminate the colors of blue, green, yellow, and red, and the color contrast also became clear.

| | |
|---|---|
| Polycarbonate resin [H-3000FN from Mitsubishi Engineering Plastics Co., Ltd.] | 60 kg |
| Ultraviolet light absorbing agent [JF-86 from Johoku Chemical Co., Ltd.] | 240 g |
| Blue light absorbing agent [PS Orange GG from Mitsui Toatsu Dyes, Ltd. | 2 g |
| Infrared light absorbing agent [IR750 from Nippon Chemicals Co., Ltd.] | 1.04 g |
| Compound (1) | 0.6 g |

EXAMPLE 5

Figure 5:
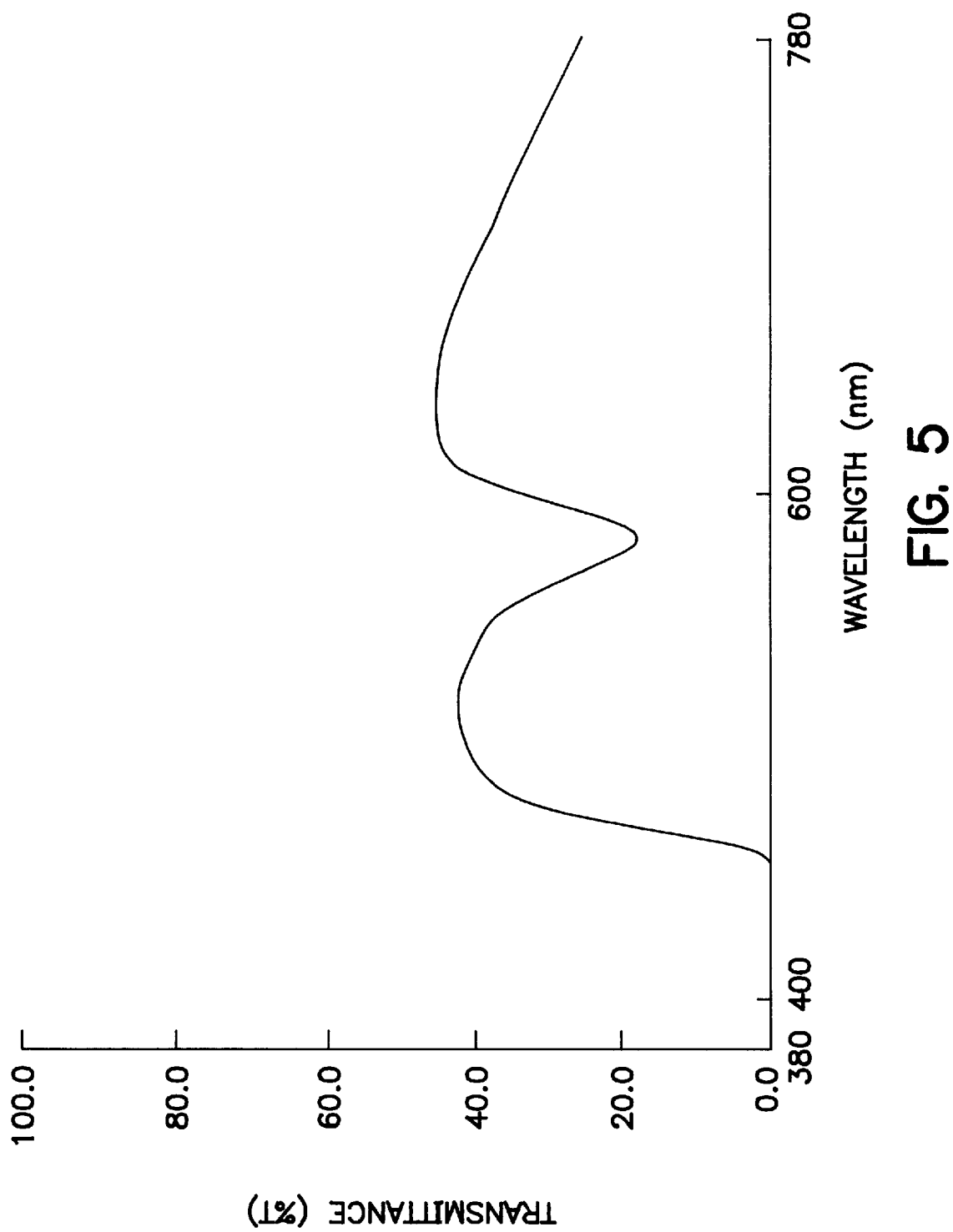
FIG. 5 is a graph showing the spectral transmittance of light through the lens obtained in Example 5 and the molded synthetic resin obtained in Example 6.

The mixture of ingredients listed below was formed into a lens having an outer diameter of 255 mm×330 mm and a central thickness of 2 mm by the injection molding machine at a regulated temperature of 250° C. to 300° C. The spectral transmittance of light through the lens thus obtained is shown in FIG. 5. This lens gave no sense of glare even under strong sunlight and no trouble in observing an object in the field of vision even when driving in a tunnel.

| | |
|---|---|
| Polycarbonate resin [H-3000FN from Mitsubishi Engineering Plastics Co., Ltd.] | 15 kg |
| Ultraviolet light absorbing agent [JF-86 from Johoku Chemical Co., Ltd.] | 60 g |
| Blue light absorbing agent [Kayaset Yellow A-G from Nippon Kayaku Co., Ltd.] | 0.75 g |
| Infrared light absorbing agent [IR750 from Nippon Chemicals Co., Ltd.] | 0.96 g |
| Compound (2) | 0.15 g |

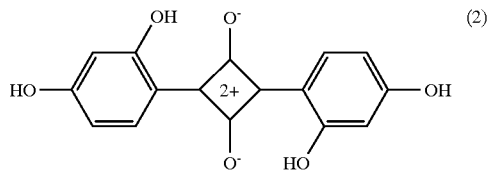

(2)

EXAMPLE 6

The same mixture as that of Example 5 was formed into a sheet having an outer diameter of 255 mm×330 mm and a thickness of 2 mm by the injection molding machine at a regulated temperature of 250° C. to 300° C. The spectral transmittance of light through the sheet thus obtained is shown in FIG. 5. When this sheet was hanged in parallel with the front surface of the CRT screen and the television game was continued on the screen, it gave no sense of glare, and slight fatigue even in a case of a long time game. Furthermore, it became easy to discriminate the colors of blue, green, yellow, and red, and the color contrast also became clear.

EXAMPLE 7

The polarizing element prepared by punching the polarizing film onto which a polycarbonate sheet was laminated on both surfaces [Eupironpola from Mitsubishi Engineering Plastics Co., Ltd., 0.8 mm thickness] so as to fit in the shape of the lens for eyeglasses was stably placed on a surface of a mold.

| | |
|---|---|
| Polycarbonate resin [H-3000FN from Mitsubishi Engineering Plastics Co., Ltd.] | 15 kg |
| Ultraviolet light absorbing agent [JF-86 from Johoku Chemical Co., Ltd.] | 60 g |
| Blue light absorbing agent [PS Orange GG from Mitsui Toatsu Dyes, Ltd.] | 0.4 g |
| Infrared light absorbing agent [IR 750 from Nippon Chemicals Co., Ltd.] | 0.78 g |
| Compound (1) | 0.42 g |

Figure 6:
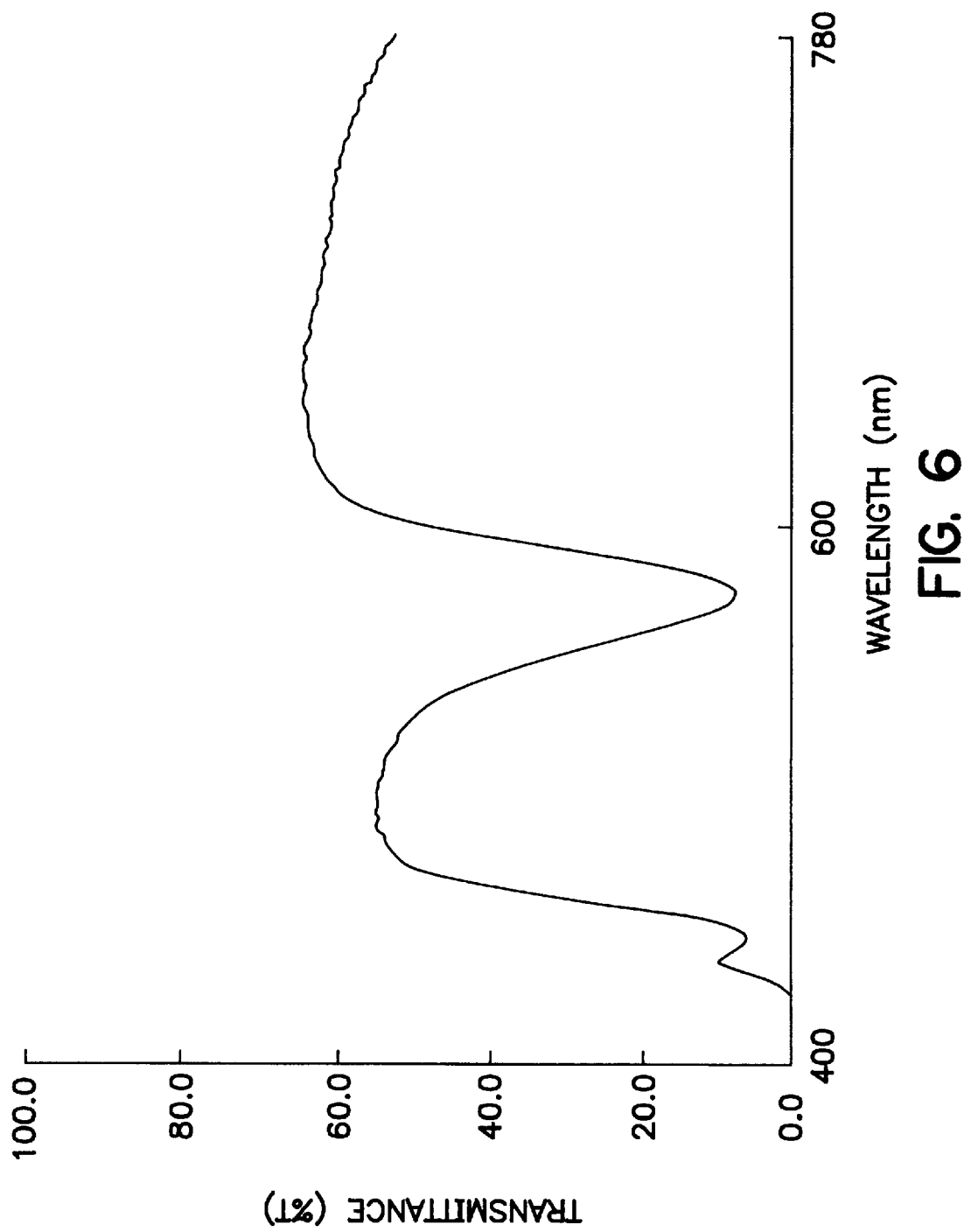
FIG. 6 is a graph showing the spectral transmittance of light through the lens obtained in Example 7 and the molded synthetic resin obtained in Example 8.

The above mixture was formed into a lens in which the polarizing element and the injected resin were incorporated into one piece and having an outer diameter of 75 mm and a central thickness of 2 mm by the above injection molding machine at a regulated temperature of 250° C. to 300° C. The spectral transmittance of light through the lens thus obtained is shown in FIG. 6. This lens gave no sense of glare even under strong sunlight, and no trouble in observing an object in the field of vision even when driving in a tunnel.

EXAMPLE 8

The polarizing element prepared by punching the polarizing film onto which the polycarbonate sheets were laminated on both surfaces [Eupironpola from Mitsubishi Engineering Plastics Co., Ltd., 0.8 mm thickness] so as to fit in the shape of the lens of eyeglasses was stably placed on the surface of a mold.

The same mixture as that of Example 7 was formed into a sheet in which the polarizing element and the injected resin were incorporated into one piece and having an outer diameter of 255 mm×330 mm and a thickness of 2 mm by the injection molding machine at a regulated temperature of 250° C. to 300° C. The spectral transmittance of light through the sheet thus obtained is shown in FIG. 6. When this sheet was hanged in parallel with the front surface of the CRT screen and the television games was continued on the screen, it gave no sense of glare even in a case of a glittering screen, and slight fatigue even in a case of a long time game. Furthermore, it became easy to discriminate the colors of blue, green, yellow, and red, and the color contrast also became clear.

EXAMPLE 9

Figure 7:
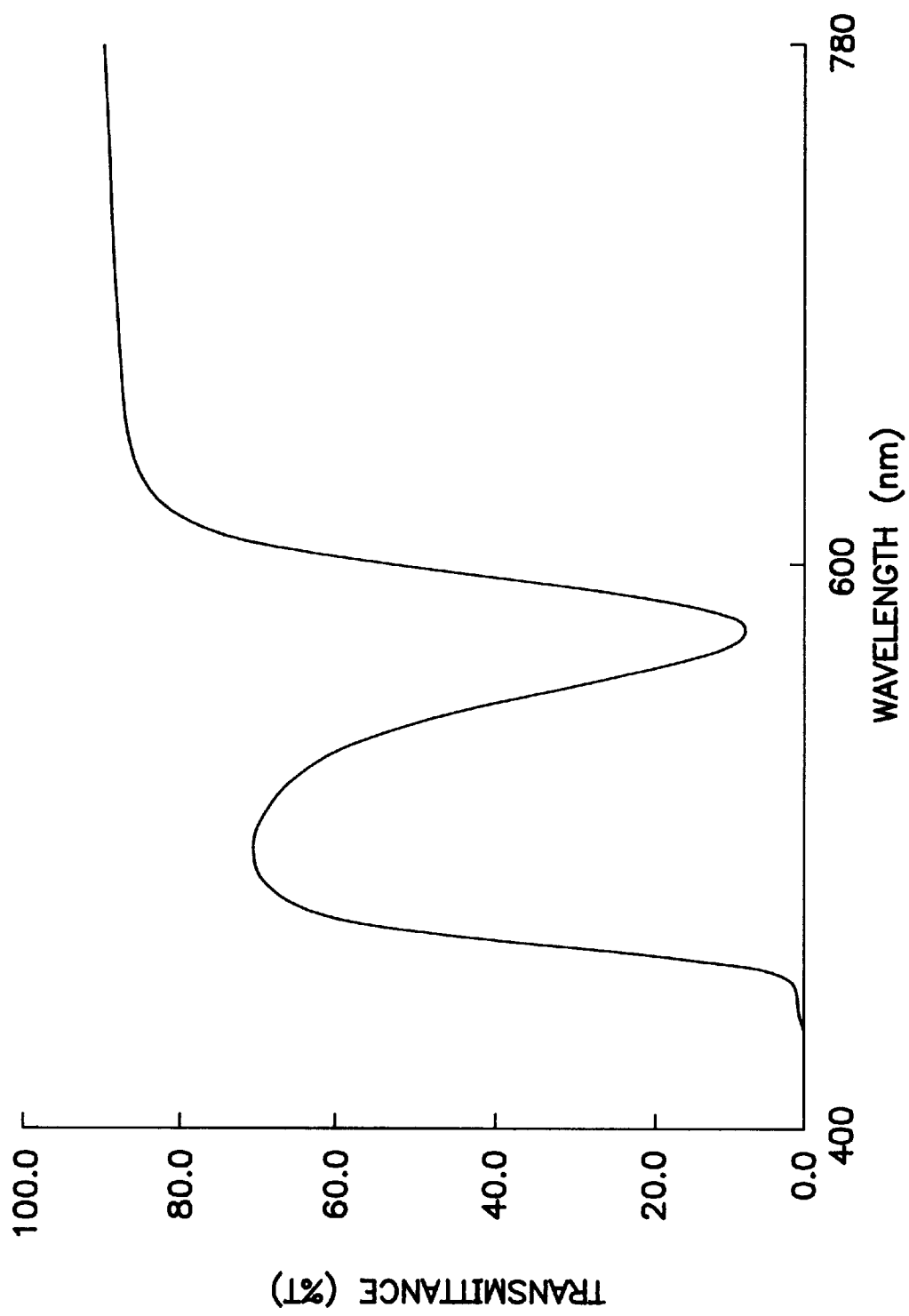
FIG. 7 is a graph showing the spectral transmittance of light through the lens obtained in Example 9 and the molded synthetic resin obtained in Example 10.

The mixture of ingredients listed below was formed into a lens having an outer diameter of 75 mm and a central thickness of 2 mm by the injection molding machine at a regulated temperature of 250° C. to 300° C. The spectral transmittance of light through the lens thus obtained is shown in FIG. 7. This lens gave no sense of glare even under strong sunlight and no trouble in observing an object in the field of vision even when driving in a tunnel.

| | |
|---|---|
| Polycarbonate resin [H-3000FN from Mitsubishi Engineering Plastics Co., Ltd.] | 15 kg |
| Ultraviolet light absorbing agent [JF-86 from Johoku Chemical Co., Ltd.] | 60 g |
| Blue light absorbing agent [Kayaset Yellow A-G from Nippon Kayaku Co., Ltd.] | 0.5 g |
| Compound (1) | 0.17 g |

EXAMPLE 10

The same mixture as that of Example 9 was formed into a sheet having an outer diameter of 255 mm×330 mm and a thickness of 2 mm by the injection molding machine at a regulated temperature of 250° C. to 300° C. The spectral transmittance of light through the sheet thus obtained is shown in FIG. 7. When this sheet was hanged in parallel with the front surface of the CRT screen and the television game was continued on the screen, it gave no sense of glare, and slight fatigue even in a case of a long time game. Furthermore, it became easy to discriminate the colors of blue, green, yellow, and red, and the color contrast also became clear.

EXAMPLE 11

The polarizing element prepared by punching the polarizing film onto which the polycarbonate sheets were laminated on both surfaces [Eupironpola from Mitsubishi Engineering Plastics Co., Ltd., 0.8 mm thickness] so as to fit in the shape of the lens of eyeglasses was stably placed on the surface of a mold.

The mixture of ingredients listed below was formed into a lens in which the polarizing element and the injected resin were incorporated into one piece and having an outer diameter of 75 mm and a central thickness of 2 mm by the injection molding machine at a regulated temperature of 250° C. to 300° C. The spectral transmittance of light through the lens thus obtained is shown in FIG. 8. This lens gave no sense of glare even under strong sunlight and no trouble in observing an object in the field of vision even when driving in a tunnel.

| | |
|---|---|
| Polycarbonate resin [H-3000FN from Mitsubishi Engineering Plastics Co., Ltd.] | 15 kg |
| Ultraviolet light absorbing agent [JF-86 from Johoku Chemical Co., Ltd.] | 60 g |
| Blue light absorbing agent [PS Orange GG from Mitsui Toatsu Dyes, Ltd.] | 0.4 g |
| Compound (1) | 0.36 g |

EXAMPLE 12

The polarizing element prepared by punching the polarizing film onto which the polycarbonate sheets were laminated on both surfaces [Eupironpola from Mitsubishi Engineering Plastics Co., Ltd., 0.8 mm thickness] so as to fit in the shape of the molded resin was stably placed on the surface of a mold.

The same mixture as that of Example 11 was formed into a sheet in which the polarizing element and the injected resin were incorporated into one piece and having an outer diameter of 255 mm×330 mm and a thickness of 2 mm by the injection molding machine at a regulated temperature of 250° C. to 300° C. The spectral transmittance of light through the sheet thus obtained is shown in FIG. 8. When this sheet was adhered to a window glass and the outside scenery was seen therethrough, it gave no sense of glare. Furthermore, it became easy to discriminate the colors of blue, green, yellow, and red, and the color contrast also became clear, and the contour of the remote mountain was clearly seen.

What is claimed is:

1. A lens for eyeglasses, which comprises a resin base material, said resin base material comprising:
   a synthetic resin,
   an organic dye with an absorption maximum in the wavelength range from 530 to 585 nm,
   an ultraviolet light absorbing agents and
   a blue light absorbing agent, the resin base material having a transmittance minimum not greater than 25% in the wavelength range from 550 to 585 nm, the average transmittance of light over the wavelength range from 590 to 660 nm being not less than 15%, and the average transmittance of light over the wavelength range from 470–550 nm being not less than 10%.

2. A lens for eyeglasses according to claim 1, which further comprises an infrared light absorbing or reflecting agent, and has a transmittance maximum not less than 30% in the wavelength range from 590 to 660 nm, and the transmittance of light at any wavelength in the range from 470 to 550 nm being not less than 15%.

3. A lens for eyeglasses according to claim 1 or 2, wherein the organic dye with an absorption maximum in the vicinity of the central wavelength on the standard relative visibility curve is a squarylium compound of formula (I):

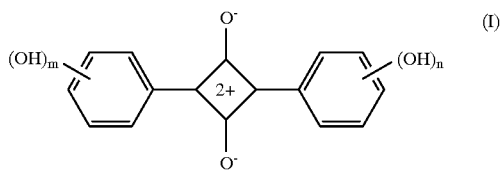

wherein m and n are the same or different and represent integers of 1 to 4.

4. A lens for eyeglasses according to claim 3, wherein the polarizing element is formed with the synthetic resin base material into one piece.

5. A molded material, which comprises a resin base material, said resin base material comprising:

a synthetic resin, an organic dye with an absorption maximum in the wavelength range from 530 to 585 nm, an ultraviolet light absorbing agent, and a blue light absorbing agent, the resin base material having a transmittance minimum not greater than 25% in the wavelength range from 550 to 585 nm, the average transmittance of light over the wavelength range from 590 to 660 nm being not less than 15%, and the average transmittance of light over the wavelength range from 470 to 550 nm being not less than 10%.

6. A molded material according to claim 5, which further comprises an infrared light absorbing or reflecting agent, and has a transmittance maximum not less than 30% in the wavelength range from 590 to 660 nm, and the transmittance of light at any wavelength in the range from 470 to 550 nm being not less than 15%.

7. A molded material according to claim 5 or 6, wherein the organic dye with an absorption maximum in the vicinity of the central wavelength on the standard relative visibility curve is a squarylium compound of formula (I):

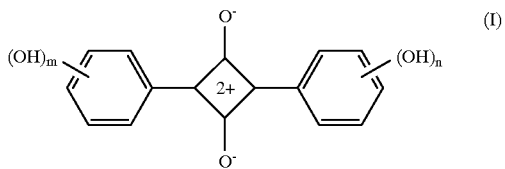

wherein m and n are the same or different and represent integers of 1 to 4.

8. A molded material according to claim 7, further comprising a polarizing element formed in one piece with the resin base material.

9. A molded material according to claim 8, which is a light transmitting filter for a color imaging device or a color image observing system.

10. A molded material according to claim 9, wherein the color imaging device is an electric display device.

11. A molded material according to claim 9, wherein the color image observing system is a window for prospect.

12. A lens for eyeglasses according to claim 1 or 2, wherein said synthetic resin is selected from the group consisting of polycarbonate, polymethyl methacrylate, diethylene glycol bisallylcarbonate, and cellulose plastics.

13. A lens for eyeglasses according to claim 12, wherein said synthetic resin is polycarbonate.

14. A lens for eyeglasses according to claim 3, wherein said synthetic resin is selected from the group consisting of polycarbonate, polymethyl methacrylate, diethylene glycol bisallylcarbonate, and cellulose plastics.

15. A lens for eyeglasses according to claim 14, wherein said synthetic resin is polycarbonate.

16. A molded material according to claim 5 or 6, wherein said synthetic resin is selected from the group consisting of polycarbonate, polymethyl methacrylate, diethylene glycol bisallycarbonate, and cellulose plastics.

17. A molded material according to claim 16, wherein said synthetic resin is polycarbonate.

18. A molded material according to claim 7, wherein said synthetic resin is selected from the group consisting of polycarbonate, polymethyl methacrylate, diethylene glycol bisallycarbonate, and cellulose plastics.

19. A molded material according to claim 18, wherein said synthetic resin is polycarbonate.

20. A lens for eyeglasses, which comprises a resin base material, said resin base material comprising:

a synthetic resin, and an organic dye with an absorption maximum in the wavelength range from 530 to 585 nm, the resin base material having a transmittance minimum not greater than 25% in the wavelength range from 550 to 585 nm, the average transmittance of light over the wavelength range from 590 to 660 nm being not less than 15%, and the average transmittance of light over the wavelength range from 470 to 550 nm being not less than 10%.

21. A molded material, which comprises a resin base material, said resin base material comprising:

a synthetic resin, and an organic dye with an absorption maximum in the wavelength range from 530 to 585 nm, the base material having a transmittance minimum not greater than 25% in the wavelength range from 550 to 585 nm, the average transmittance of light over the wavelength range from 590 to 660 nm being not less than 15%, and the average transmittance of light over the wavelength range from 470 to 550 nm being not less than 10%.

* * * * *

UNITED STATES PATENT AND TRADEMARK OFFICE
CERTIFICATE OF CORRECTION

PATENT NO. : 5,922,246

DATED : July 13, 1999

INVENTOR(S) : SHOSHIRO MATSUSHITA ET AL.

It is certified that error appears in the above-identified patent and that said Letters Patent is hereby corrected as shown below:

TITLE PAGE AT [30], FOREIGN APPLICATION PRIORITY DATA

"6-192988" should read --7-192988--;
"8-13706" should read --9-13706--.

TITLE PAGE AT [73], ASSIGNEES

"Yamamoto Kogaku," should read --Yamamoto Kogaku Co., Ltd.,--.

COLUMN 1

Line 64, "these lenses are hard" should read --it is difficult for these lenses--.

COLUMN 2

Line 4, "shut up" should read --block--;
Line 16, "CRP" should read --CRT--;
Line 20, "may" should read --may be--.

COLUMN 4

Line 33, "not" should read --is not--;
Line 56, "include" should read --includes--.

COLUMN 5

Line 23, "filed" should read --field--;
Line 44, "posed" should read --posing--.

COLUMN 6

Line 28, "like to use." should read --like.--.

COLUMN 7

Line 61, "hanged" should read --hung--.

UNITED STATES PATENT AND TRADEMARK OFFICE
CERTIFICATE OF CORRECTION

PATENT NO. : 5,922,246
DATED : July 13, 1999
INVENTOR(S) : SHOSHIRO MATSUSHITA ET AL.

It is certified that error appears in the above-identified patent and that said Letters Patent is hereby corrected as shown below:

COLUMN 8

Line 51, "hanged" should read --hung--.

COLUMN 9

Line 36, "hanged" should read --hung--;
   Line 37, "games" should read --game--.

COLUMN 10

Line 3, "hanged" should read --hung--;
   Line 65, "agents" should read --agent,--.

Signed and Sealed this

Eleventh Day of January, 2000

Attest:

Q. TODD DICKINSON

Attesting Officer     Acting Commissioner of Patents and Trademarks